B. M. HARTLEY.
FISHING FLOAT.
APPLICATION FILED FEB. 6, 1913.
1,072,005.
Patented Sept. 2, 1913.
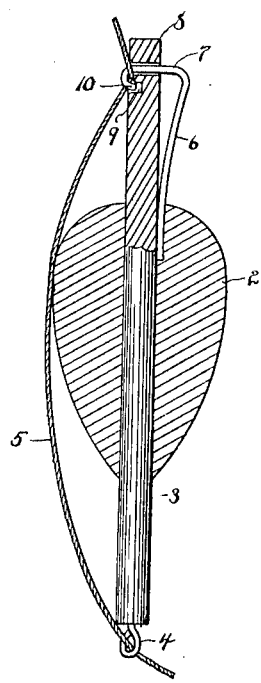
Witnesses
D. S. Earle
M. P. Nichols
Inventor
Bernard M. Hartley
by Seymour T. Earle
Attys

UNITED STATES PATENT OFFICE.

BERNARD M. HARTLEY, OF WEST HAVEN, CONNECTICUT, ASSIGNOR OF ONE-HALF TO WILLIAM F. SWIFT, OF WEST HAVEN, CONNECTICUT.

FISHING-FLOAT.

1,072,005.  Specification of Letters Patent.  Patented Sept. 2, 1913.

Application filed February 6, 1913. Serial No. 746,473.

*To all whom it may concern:*

Be it known that I, BERNARD M. HARTLEY, a citizen of the United States, residing at West Haven, in the county of New Haven and State of Connecticut, have invented a new and useful Improvement in Fishing-Floats; and I do hereby declare the following, when taken in connection with the accompanying drawings and the characters of reference marked thereon, to be a full, clear, and exact description of the same, and which said drawings constitute part of this application and represent a sectional view of a float constructed in accordance with my invention.

This invention relates to an improvement in fishing floats, and particularly to means for attaching fish lines thereto whereby the float may be readily adjusted on a line at different points, the object of the invention being a simple construction which permits the ready attachment of and adjustment on a fish line; and the invention consists in the construction hereinafter described and particularly recited in the claim.

In carrying out my invention, I employ a float 2 of any desired form having a stem 3 extending logitudinally through it and projecting beyond the opposite ends. The lower end may be provided with the usual eye 4 through which a line 5 passes. Entered into the top of the body and preferably at one side of the stem 3 is a spring wire shank 6 having an end 7 bent at substantial right angles and projecting through a hole 8 formed in the stem which stem is formed on one side below the hole with a notch 9 to receive the hooked end 10 of the wire. The bend 7 is longer than the diameter of the stem so that the wire may be pressed through the hole so as to clear the hooked end 10 from the notch 9 for the introduction between the hook and the stem of the fish line which is clamped to the stem by the hooked end of the wire, the wire being spring wire. This device holds the line with sufficient friction to prevent the float from sliding on the line, yet permits the line to be readily attached, and by moving the wire permits the float to be readily adjusted on the line. By having the wire pass through a hole in the stem it is held against longitudinal movement so that the inner end of the wire is not required to be anchored in the float.

I claim:

A float for fishing lines comprising a body portion, a stem projecting beyond the opposite ends of the body, said stem formed with a hole and with a notch, a spring wire secured to the body and bent to pass through the hole, and formed with a hooked end the inner edge of the hooked portion adapted to come to a bearing against the side of the stem so as to clamp a line to the stem and the point of the hook adapted to enter the said notch.

In testimony whereof, I have signed this specification in the presence of two subscribing witnesses.

BERNARD M. HARTLEY.

Witnesses:
CLARA L. WEED,
MALCOLM P. NICHOLS.

---

Copies of this patent may be obtained for five cents each, by addressing the "Commissioner of Patents, Washington, D. C."